(12) United States Patent  
Mood et al.

(10) Patent No.: US 7,996,898 B2  
(45) Date of Patent: Aug. 9, 2011

(54) SYSTEM AND METHOD FOR MONITORING EVENTS ON A COMPUTER TO REDUCE FALSE POSITIVE INDICATION OF PESTWARE

(75) Inventors: Sarah L. Mood, Superior, CO (US); Bradley D. Stowers, Mead, CO (US); Michael P. Greene, Boulder, CO (US)

(73) Assignee: Webroot Software, Inc., Broomfield, CO (US)

( * ) Notice: Subject to any disclaimer, the term of this patent is extended or adjusted under 35 U.S.C. 154(b) by 892 days.

(21) Appl. No.: 11/258,536

(22) Filed: Oct. 25, 2005

(65) Prior Publication Data

US 2007/0094732 A1    Apr. 26, 2007

(51) Int. Cl.
*G06F 21/22* (2006.01)
(52) U.S. Cl. ............................................. 726/23; 726/22
(58) Field of Classification Search .................. 726/22, 726/26; 713/165–167, 151–152
See application file for complete search history.

(56) References Cited

U.S. PATENT DOCUMENTS

| | | | |
|---|---|---|---|
| 5,485,575 A | 1/1996 | Chess | |
| 5,621,889 A * | 4/1997 | Lermuzeaux et al. | 726/22 |
| 5,623,600 A | 4/1997 | Ji et al. | |
| 5,696,822 A | 12/1997 | Nachenberg | |
| 5,826,013 A | 10/1998 | Nachenberg | |
| 5,974,549 A * | 10/1999 | Golan | 726/23 |
| 6,069,628 A | 5/2000 | Farry et al. | |
| 6,073,241 A | 6/2000 | Rosenberg et al. | |
| 6,092,194 A | 7/2000 | Touboul | |
| 6,154,844 A | 11/2000 | Touboul | |
| 6,167,520 A | 12/2000 | Touboul | |
| 6,192,512 B1 | 2/2001 | Chess | |
| 6,253,258 B1 | 6/2001 | Cohen | |
| 6,310,630 B1 | 10/2001 | Kulkarni et al. | |
| 6,357,008 B1 | 3/2002 | Nachenberg | |
| 6,397,264 B1 | 5/2002 | Stasnick et al. | |
| 6,460,060 B1 | 10/2002 | Maddalozzo, Jr. et al. | |
| 6,480,962 B1 | 11/2002 | Touboul | |

(Continued)

FOREIGN PATENT DOCUMENTS

WO PCT/US2007/067078    11/2007

OTHER PUBLICATIONS

Yi-Min Wang et al.; "Detecting Stealth Software with Strider Ghostbuster," Dependable Systems and Networks, 2005, DSN 2005, Proceedings, International Conference on Yokohama, Japan 28-0 Jun. 2005, Piscatay, NJ, USA, IEE, Jun. 28, 2005; pp. 368-377; XP010817813; ISBN: 0-7695-2282-3.

(Continued)

*Primary Examiner* — Minh Dinh
*Assistant Examiner* — Venkat Perungavoor
(74) *Attorney, Agent, or Firm* — Cooley LLP

(57) ABSTRACT

A system and method for reducing false positive indications of pestware on a protected computer is disclosed. In one variation, the method includes tracking activities of a user at the protected computer, monitoring events at the protected computer, identifying events that are potentially indicative of pestware, comparing at least one of the events with at least one of the activities of the user and initiating, in response to the comparing indicating the activities of the user are unconnected with the events, a user prompt that informs the user about the events to enable the user to make a decision relative to managing the events.

18 Claims, 3 Drawing Sheets

U.S. PATENT DOCUMENTS

| | | | |
|---|---|---|---|
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |
| 6,735,703 B1 | 5/2004 | Kilpatrick | |
| 6,775,780 B1 | 8/2004 | Muttik | |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungek | |
| 6,851,057 B1 | 2/2005 | Nachenberg | |
| 6,965,968 B1 | 11/2005 | Touboul | |
| 6,973,577 B1 * | 12/2005 | Kouznetsov | 726/25 |
| 7,058,822 B2 | 6/2006 | Edery et al. | |
| 7,210,168 B2 | 4/2007 | Hursey | |
| 2003/0084323 A1 * | 5/2003 | Gales | 713/200 |
| 2003/0159070 A1 | 8/2003 | Mayer | |
| 2003/0212906 A1 | 11/2003 | Arnold | |
| 2003/0217287 A1 | 11/2003 | Kruglenko | |
| 2004/0015726 A1 | 1/2004 | Szor | |
| 2004/0024864 A1 | 2/2004 | Porras | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0225877 A1 | 11/2004 | Huang | |
| 2004/0230530 A1 * | 11/2004 | Searl et al. | 705/51 |
| 2005/0138433 A1 | 6/2005 | Linetsky | |
| 2005/0172115 A1 | 8/2005 | Bordorin | |
| 2005/0188272 A1 | 8/2005 | Bordorin | |
| 2005/0188423 A1 * | 8/2005 | Motsinger et al. | 726/22 |
| 2007/0006311 A1 * | 1/2007 | Barton et al. | 726/24 |

OTHER PUBLICATIONS

U.S. Appl. No. 10/956,573, filed Oct. 1, 2004, Steve Thomas.
U.S. Appl. No. 10/956,574, filed Oct. 1, 2004, Steve Thomas.
Codeguru, Three Ways to Inject Your Code Into Another Process, by Robert Kuster, Aug. 4, 2003, 22 pgs.
Codeguru, Managing Low-Level Keyboard Hooks With the Windows API for VB .Net, by Paul Kimmel, Apr. 18, 2004, 10 pgs.
Codeguru, Hooking the Keyboard, by Anoop Thomas, Dec. 13, 2001, 6 pgs.
Illusive Security, Wolves in Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass a Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.

* cited by examiner

SYSTEM AND METHOD FOR MONITORING EVENTS ON A COMPUTER TO REDUCE FALSE POSITIVE INDICATION OF PESTWARE

RELATED APPLICATIONS

The present application is related to commonly owned and assigned application Ser. No. 10/956,573, entitled System and Method For Heuristic Analysis to Identify Pestware, now U.S. Pat. No. 7,480,683, which is incorporated herein by reference.

The present application is related to commonly owned and assigned application Ser. No. 10/956,574, entitled System and Method for Pestware Detection and Removal, which is incorporated herein by reference.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects information about a person or an organization.

Software is available to detect and inform a user that there has been activity on their computer that may be indicative of pestware. Unfortunately, available software is often unable to discriminate between activities initiated by the user and activities carried out by pestware. As an example, currently available software is known to provide false alarms, which warn the user about activities that the user initiated. As a consequence, the user is faced with a warning, which at the very least is annoying, and worse, may lead the user to disable some or all of the warning capabilities of the software. Accordingly, current techniques and software are not always satisfactory and will most certainly not be satisfactory in the future.

SUMMARY OF THE INVENTION

In one embodiment, the invention may be characterized as a method for managing pestware on a protected computer. The method includes tracking activities of a user at the protected computer, monitoring events at the protected computer, identifying events that are potentially indicative of pestware, comparing at least one of the events with at least one of the activities of the user and initiating, in response to the comparing indicating the activities of the user are unconnected with the events, a user prompt, wherein the user prompt informs the user about at least one of the events so as to enable the user to make a decision relative to managing the at least one of the events.

In another embodiment, the invention may be characterized as a method for reducing false-positive indications of pestware. The method including monitoring an application of a protected computer, identifying a change in an application setting that is utilized by the application, determining whether the change to the setting was initiated via a process unassociated with the user application and informing, in response to the change to the setting being initiated by the process unassociated with the user application, a user of the protected computer about the changed setting.

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
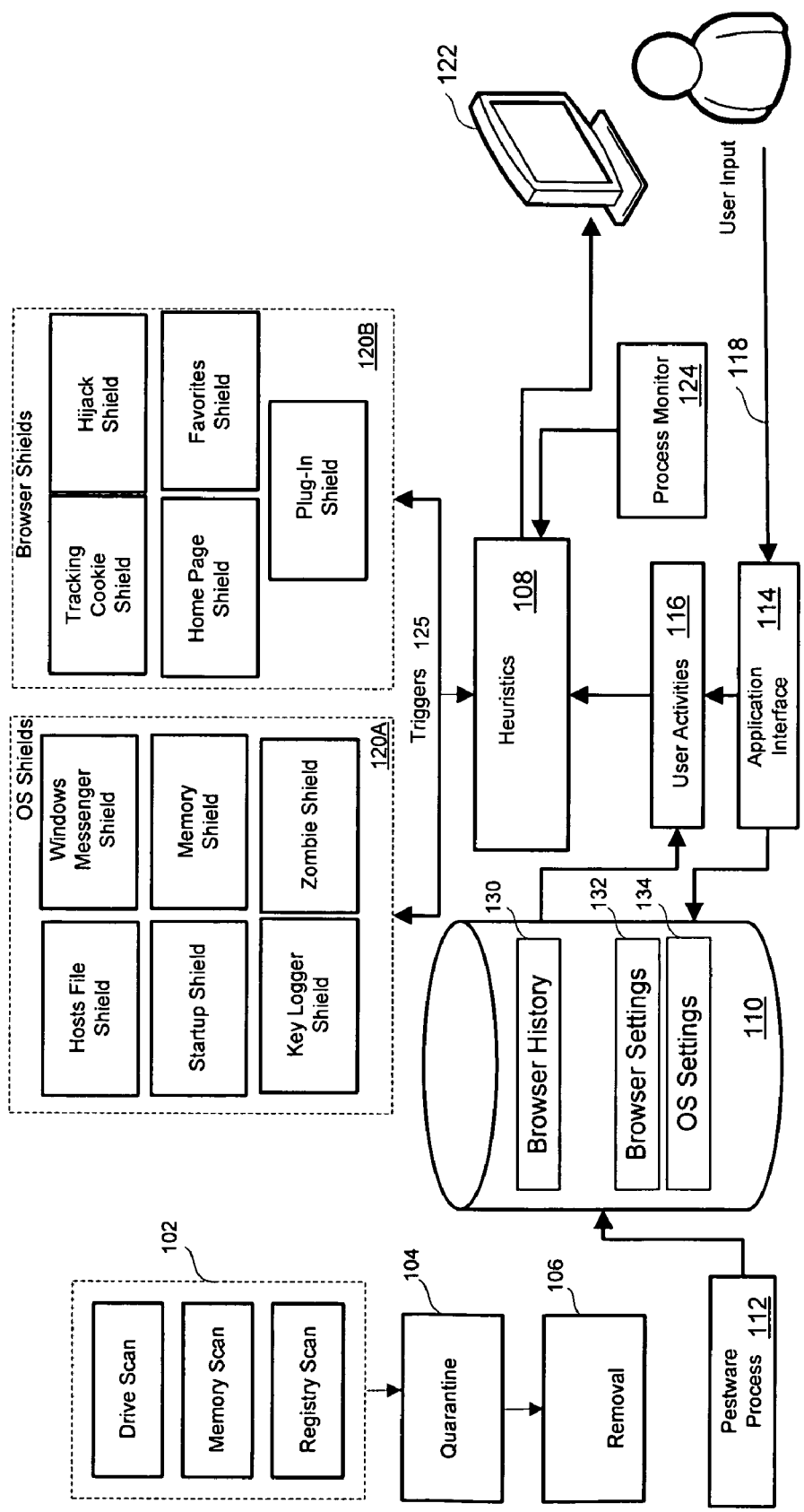
FIG. 1 illustrates a block diagram of one implementation of the present invention.

Referring now to the drawings, where like or similar elements are designated with identical reference numerals throughout the several views, and referring in particular to FIG. 1, it illustrates a block diagram of one implementation of the present invention. Shown is a protected computer 100 that includes a sweep engine 102, quarantine engine 104, removal engine 106, and shields 120. Also shown are an application interface 114 that is coupled to a user activity tracker 116 and a user input 118. In addition, a heuristics module 108 is in communication with the shields 120 and the user activity tracker 116.

Each of these modules can be implemented in software or hardware. And if implemented in software, the modules can be implemented in a single software package or in multiple software packages. In addition, one of ordinary skill in the art will recognize that the software can be designed to operate on any type of computer system including WINDOWS and Linux-based systems. Additionally, the software can be configured to operate on personal computers and/or servers. For convenience, embodiments of the present invention are generally described herein with relation to WINDOWS-based systems. Those of skill in the art can easily adapt these implementations for other types of operating systems or computer systems.

Also shown in the protected computer is a file storage device 110, which provides storage for a collection of files including browser history information 130, browser settings 132 and operating system (OS) settings 134. The file storage device 110 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 110, which is depicted for convenience as a single storage device, may be realized by multiple (e.g., distributed) storage devices. Also shown are a display 122, and a user input 118, which are communicatively coupled to the protected computer 100

As depicted in FIG. 1, a pestware process 112 is in communication with the file storage device 110 and is configured to make changes to either or both of the browser settings and/or operating system (OS) settings without approval and/or the knowledge of the user.

According to several embodiments, the pestware-protection functions operating on the protected computer 100 are represented by the sweep engine 102, the quarantine engine 104, the removal engine 106, the shields 120 and the heuristic engine 108. The basic functions of the sweep, quarantine, and removal engines (102, 104, 106) are to compare files and registry entries on the protected computer against known pestware definitions and characteristics. When a match is found, the file is quarantined and removed. Details associated with several embodiments of sweep, quarantine, and removal engines are found in the above-identified application entitled System and Method for Pestware Detection and Removal.

Pestware and pestware activity can also be identified by the shields 120, which generally run in the background on the computer system. In the exemplary embodiment depicted in FIG. 1, the shields 120 are divided into the operating system shields 120A and the browser shields 120B. The shields 120 are designed to watch for pestware and for typical pestware activity and includes two types of shields: behavior-monitoring shields and definition-based shields.

The shields 120 monitor the protected computer 100 for certain types of activities that generally correspond to pestware behavior. Examples of some of the types of activities that are monitored include a process spawning another process, an alteration to registry entries, communications with remote sites via the Internet, alterations to a start up folder, injection of a DLL into another process, and a change to the browser's home page and/or bookmarks. In the exemplary embodiment, the shields 120 inform the heuristics engine 108 about the activities and the heuristics engine 108 determines whether the user should be informed and/or whether the activity should be blocked.

It should be recognized that the block diagram in FIG. 1 depicts functional capabilities associated with several embodiments of the present invention. One of ordinary skill in the art will recognize that the functions described with reference to FIG. 1 may be realized by various implementations of software in connection with hardware or hardware alone. In these implementations several functions may be consolidated into a single module, for example, and as a consequence, may appear different from the block diagram in FIG. 1 without departing from the scope of the present invention.

In the exemplary embodiment, the browser shield 120B includes:

Favorites Shield—The favorites shield monitors for any changes to a browser's list of favorite Web sites.

Browser-Hijack Shield—The browser-hijack shield monitors the WINDOWS registry file for changes to any default Web pages. For example, the browser-hijack shield could watch for changes to the default search page stored in the registry file.

Cookie Shield—The cookie shield monitors for third-party cookies being placed on the protected computer. These third-party cookies are generally the type of cookie that relay information about Web-surfing habits to an ad site. The cookie shield can automatically block third-party cookies or it can present the user with the option to approve the cookie placement.

Homepage Shield—The homepage shield monitors the identification of a user's homepage.

Plug-in Shield—This shield monitors for the installation of plug-ins. For example, the plug-in shield looks for processes that attach to browsers and then communicate through the browser. Plug-in shields can monitor for the installation of any plug-in or can compare a plug-in to a pestware definition. For example, this shield could monitor for the installation of INTERNET EXPLORER Browser Help Objects The operating system shields 120A include:

Host-File Shield—The host-file shield monitors the host file for changes to DNS addresses. For example, some pestware will alter the address in the host file for yahoo.com to point to an ad site. Thus, when a user types in yahoo.com, the user will be redirected to the ad site instead of yahoo's home page.

Zombie shield—The zombie shield monitors for pestware activity that indicates a protected computer is being used unknowingly to send out spam or email attacks. The zombie shield generally monitors for the sending of a threshold number of emails in a set period of time. For example, if ten emails are sent out in a minute, then the user could be notified and user approval required for further emails to go out. Similarly, if the user's address book is accesses a threshold number of times in a set period, then the user could be notified and any outgoing email blocked until the user gives approval. And in another implementation, the zombie shield can monitor for data communications when the system should otherwise be idle.

Startup shield—The startup shield monitors the run folder in the WINDOWS registry for the addition of any program. It can also monitor similar folders, including Run Once, Run OnceEX, and Run Services in WINDOWS-based systems. And those of skill in the art can recognize that this shield can monitor similar folders in Unix, Linux, and other types of systems.

WINDOWS-messenger shield—The WINDOWS-messenger shield watches for any attempts to turn on WINDOWS messenger. If an attempt to turn it on is detected, the shield triggers an alert.

Memory shield—The memory shield is similar to the installation shield. The memory-shield scans through running processes matching each against the known definitions and notifies the user if there is a spy running. If a running process matches a definition, an alert is generated. This shield is particularly useful when pestware is running in memory before any of the shields are started.

Key-logger shield—The key-logger shield monitors for pestware that captures and reports out key strokes by comparing programs against definitions of known key-logger programs. The key-logger shield, in some implementations, can also monitor for applications that are logging keystrokes—independent of any pestware definitions. Similarly, any key-logging application that is discovered through the definition process is targeted for shut down and removal. The key-logger shield could be incorporated into other shields and does not need to be a stand-alone shield.

In the present embodiment, the heuristics engine 108 is tripped by one of the shields 120 (shown as trigger 125) in response to the shields identifying events that are indicative of pestware activity. Stated differently, the shields 120 report any suspicious activity to the heuristics engine 108.

The user activity tracker 116 in the exemplary embodiment is configured to track and provide information about the user's activities to the heuristics engine 108. As depicted in FIG. 1, for example, the activity tracker 116 receives, from the application interface 114, information about user activity that is taking place at the user input 118 so as to identify activities initiated by the user.

The application interface 114 in the exemplary embodiment is any one of many potential interfaces (e.g., a graphical interface, command line or pull-down menu) utilized by applications (e.g., an Internet browser) or the operating system of the protected computer. The user input 118 may be, for example and without limitation, a voice input, a pointing device (e.g., mouse) input and/or an input from a keyboard. In this way, the user activity tracker 116 tracks the user's activities relative to various applications and/or the operating system of the protected computer.

In addition, as depicted in FIG. 1, the activity tracker 116 may receive information about the user's activities from files (e.g., the browser history 130) generated from applications (e.g., an Internet browser) utilized by the user.

While referring to FIG. 1, simultaneous reference will be made to FIG. 2, which is a flowchart depicting steps carried out by components of the protected computer 100 to manage pestware while reducing a number of false positive identifications of pestware activity.

Figure 2:
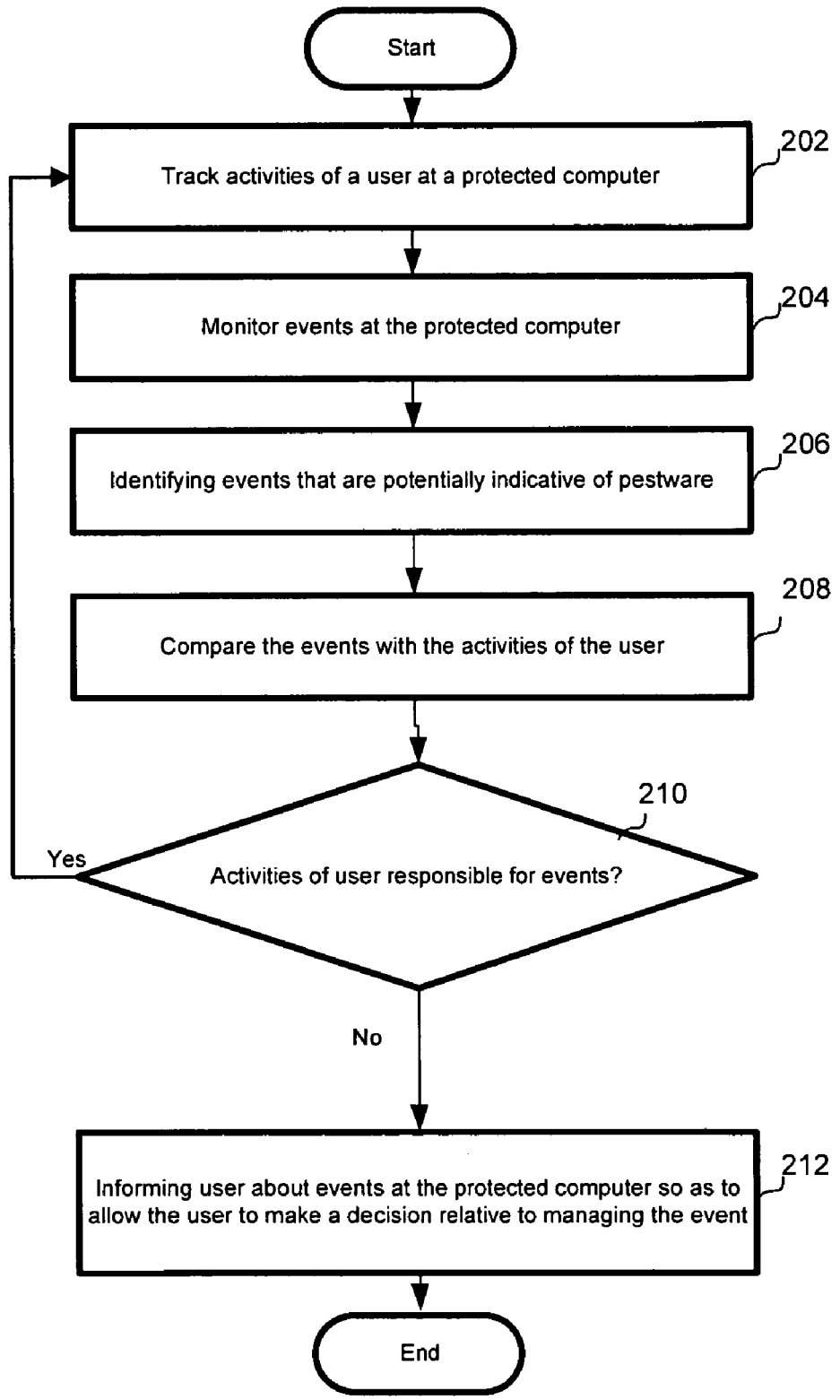
FIG. 2 is a flowchart of one method for managing pestware.

As shown in FIG. 2, in accordance with this method, a user's activities at the protected computer are tracked (Block 202). In the exemplary embodiment depicted in FIG. 1, activities of the user are tracked by the activity tracker 116, which is configured to receive information about the user's browsing activities (i.e., the websites the user visited) from the browser history 130. In addition, the activity tracker 116 is configured to receive information about activities of the user carried out via the application interface 114.

In one embodiment, for example, the application interface 114 is a user interface (e.g., pull down menu or graphical interface) for a browser of the protected computer. In this embodiment, the activities of the user relative to the application interface 114 are tracked by the activity tracker 116 so that any changes to settings made via the application interface 114 are identified.

As depicted in FIG. 2, events are also monitored at the protected computer (Block 204), and events that are indicative of pestware are identified (Block 206). As discussed above, the shields 120 in the exemplary embodiment of FIG. 1 monitor events that are indicative of pestware and report the events to the heuristics engine 108. For example, if a change in a home page setting for a browser is detected, the shields 120 report the event to the heuristics engine 108.

Once an event or events are identified, they are compared with the activities of the user so as to identify whether the user's activities are responsible for the events (Blocks 208, 210). For example, if the event that triggered a shield to trip the heuristics engine 108 was a change to the browser settings 132 (e.g., home page setting or list of user favorites), the browser history 130 is retrieved by the activity tracker 116 and provided to the heuristics engine 108 so that the heuristics engine 108 may make a more informed analysis of whether the user intended to change the favorites list.

For example, if the browser history 130 indicates the user previously visited web sites that have been added to a browser's favorites list, the likelihood that the user intended to make the changes greater than if the user had not previously visited the web sites.

In addition, information about whether the user accessed the application interface 114 when making changes to application settings is retrieved by the activity tracker 116 and provided to the heuristics engine 108. For example, when the application interface 114 is an "Internet Options" window, information about whether the window was open when a change (a homepage change) was made is provided to the heuristics engine 108 by the activity tracker 116. In this way, the heuristics engine 108 may compare the activities of the user with the identified events and perform a more informed analysis of whether the events are indeed events associated with pestware or events that are due to the user's activities.

As shown in FIG. 2, if the comparison between the activities of the user and the events indicate that the user is responsible (or very likely responsible) for the event (Block 210), the user is not informed about the event at the protected computer and Blocks 202-210 are repeated. In this way, false positive notifications of pestware-related events are reduced or prevented altogether. If, however, the comparison indicates the user likely was not responsible for the event(s), the user is informed about the event(s) so as to allow the user to make a decision relative managing the event (Block 212).

It is contemplated that is some instances the heuristics engine 108 may utilize both historical data about a user's activities (e.g., browser history) and the user's activities that are contemporaneous with the event (e.g., any application interface accessed by the user) when analyzing the likelihood the event is due to user activities. In other instances, the heuristics engine 108 may simply recognize that the user was using a particular application interface (e.g., an Internet options menu) when the event (e.g., a homepage change) occurred and not inform the user about the event.

Figure 3:
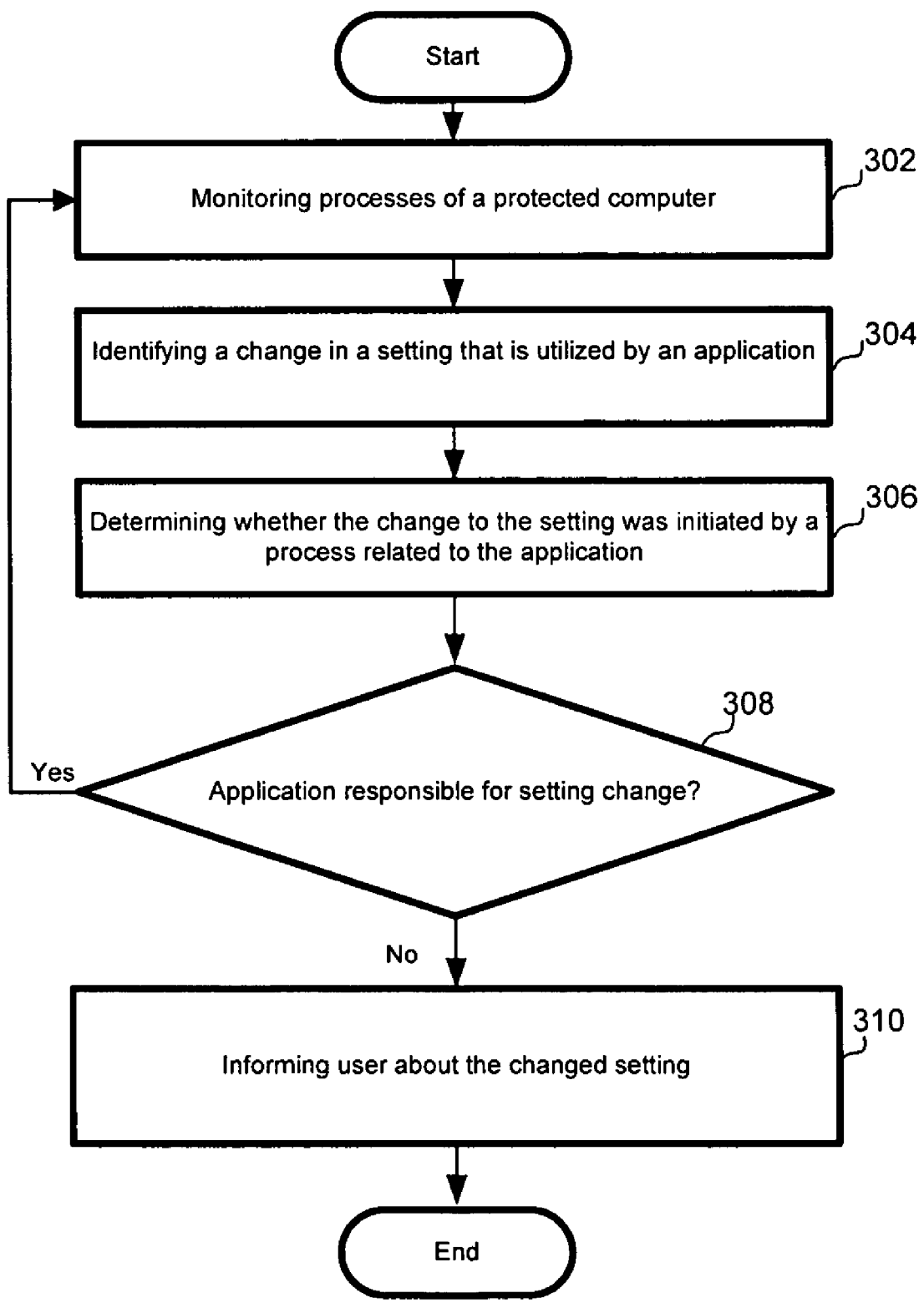
FIG. 3 is a flowchart of another method for managing pestware.

Referring next to FIG. 3, shown is a flowchart depicting another method for reducing a number of false positive pestware alerts. As depicted in FIG. 3, processes are monitored on the protected computer (Block 302), and if any attempts to change a setting (e.g., a homepage setting) that is utilized by an application (e.g., a browser) are made (Block 304), a determination is made as to whether the attempted change to the setting is initiated by a process related to the application (Block 306).

In the exemplary embodiment depicted in FIG. 1, a process monitor 124, which may be realized by a kernel mode driver, is utilized to identify the process(es) that attempt to make changes to particular settings (e.g., to the browser settings 132 or OS settings 134). As depicted in FIG. 3, if a process that is associated with the application or operating system is attempting to make the setting change (Block 308), the user is not alerted about the setting change. If, however, a process that is not associated with the application or operating system is attempting to make the change (Block 308), the user is informed about the process attempting to make the change (Block 310).

It should be recognized that the methods described with reference to FIGS. 2 and 3 are depicted in separate drawings merely for clarity. For example, it is certainly contemplated that the method depicted in FIG. 2 may be utilized in connection with the method depicted in FIG. 3 in order to reduce a number of false positive alerts.

Moreover, the method depicted in FIG. 2, may be utilized after the method in FIG. 3 is utilized to provide improved results over the method of FIG. 3 alone. For example, if the method described with reference to FIG. 3 identifies that an attempted setting change (e.g., homepage setting) is being attempted by a process that is associated with the associated application (e.g., Internet browser), then the method described with reference to FIG. 2 may be utilized to determine whether the user's activities (e.g., accessing an Internet options menu of the application) indicate the change is actually intended to be made by the user.

In this way, if pestware commandeers a known process to make a setting change to an application that is associated with the known process (so that the setting change appears to be unrelated to pestware), the user activities may be utilized in accordance with the method depicted in FIG. 2 to confirm whether the user is attempting to make the change (e.g., via the user interface of the application).

In conclusion, the present invention provides, among other things, a system and method for managing pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for managing pestware on a protected computer comprising:
   tracking activities of a user at the protected computer;
   monitoring events at the protected computer;
   identifying monitored events that are potentially indicative of pestware;
   comparing at least one of the identified monitored events with at least one of the activities of the user; and
   initiating, in response to a comparing that indicates the activities of the user are unconnected with the identified monitored events, a user prompt, wherein the user prompt informs the user about at least one of the identified monitored events so as to enable the user to make a decision relative to managing the at least one of the identified monitored events.

2. The method of claim 1, wherein the activities include activities selected from the group consisting of selecting a new homepage, adding a new bookmark, and selecting a new search page.

3. The method of claim 1, wherein the tracking activities of a user at the protected computer includes tracking websites visited by the user.

4. The method of claim 1, wherein the tracking activities of a user at the protected computer includes tracking at least one user interface utilized by the user.

5. The method of claim 4, wherein the at least one user interface is an options window of a web browser.

6. The method of claim 4, wherein comparing at least one of the identified monitored events with the activities of the user includes determining whether the at least one user interface is being utilized when the at least one of the identified monitored events is detected.

7. The method of claim 3, wherein the at least one of the identified monitored events is a change to a setting of a browser, wherein the change to the setting includes a pointer to a particular website, and wherein comparing the at least one of the identified monitored events with at least one of the activities of the user includes determining whether the particular website is one of the tracked websites visited by the user.

8. The method of claim 1, wherein the identified monitored events include events selected from the group consisting of a change in a homepage; an addition of a new bookmark; and a change in a search page.

9. A method for reducing false-positive indications of pestware comprising:
   monitoring an application of a protected computer;
   identifying a change in an application setting, wherein the application setting is utilized by the application;
   determining whether the change to the setting was initiated via a process unassociated with the user application; and
   informing, in response to the change to the setting being initiated by the process unassociated with the user application, a user of the protected computer about the changed setting.

10. The method of claim 9, wherein the application is a web browser and wherein the application setting is selected from the group consisting of a homepage setting, a bookmark setting, and a search page setting.

11. A non-transitory computer readable medium encoded with processor-executable instructions for managing pestware on a protected computer, the instructions comprising:
   tracking activities of a user at the protected computer;
   monitoring events at the protected computer;
   identifying monitored events that are potentially indicative of pestware;
   comparing at least one of the identified monitored events with at least one of the activities of the user; and
   initiating, in response to a comparing that indicates the activities of the user are unconnected with the identified monitored events, a user prompt, wherein the user prompt informs the user about at least one of the identified monitored events so as to enable the user to make a decision relative to managing the at least one of the identified monitored events.

12. The non-transitory computer readable medium of claim 11, wherein the activities include activities selected from the group consisting of selecting a new homepage, adding a new bookmark, and selecting a new search page.

13. The non-transitory computer readable medium of claim 11, wherein the instructions for tracking activities of a user at the protected computer include instructions for tracking websites visited by the user.

14. The non-transitory computer readable medium of claim 11, wherein the instructions for tracking activities of a user at the protected computer includes instructions for tracking at least one user interface utilized by the user.

15. The non-transitory computer readable medium of claim 14, wherein the at least one user interface is an options window of a web browser.

16. The non-transitory computer readable medium of claim 14, wherein the instructions for comparing at least one of the identified monitored events with the activities of the user includes instructions for determining whether the at least one user interface is being utilized when the at least one of the identified monitored events is detected.

17. The non-transitory computer readable medium of claim 13, wherein the at least one of the identified monitored events is a change to a setting of a browser, wherein the change to the setting includes a pointer to a particular website, and wherein the instructions for comparing the at least one of the identified monitored events with at least one of the activities of the user includes instructions for determining whether the particular website is one of the tracked websites visited by the user.

18. The non-transitory computer readable medium of claim 11, wherein the events include events selected from the group consisting of a change in a homepage; an addition of a new bookmark; and a change in a search page.

* * * * *